(12) United States Patent
Franco et al.

(10) Patent No.: US 8,392,474 B2
(45) Date of Patent: Mar. 5, 2013

(54) WEB DISTRIBUTED STORAGE SYSTEM

(75) Inventors: Lucas Goncalves Franco, Sao Paulo (BR); Luis Cezar Menezes Tavares de Lacerda, Brasilia (BR); Renato de Pierri, Sao Paulo (BR); Eduardo Rodrigues, Santa Luzia (BR)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 12/818,412

(22) Filed: Jun. 18, 2010

(65) Prior Publication Data

US 2011/0022640 A1    Jan. 27, 2011

(30) Foreign Application Priority Data

Jul. 21, 2009  (CA) .................................... 2673554

(51) Int. Cl.
*G06F 7/00* (2006.01)
*G06F 17/30* (2006.01)

(52) U.S. Cl. ........................ 707/812; 707/679
(58) Field of Classification Search .................. None
See application file for complete search history.

(56) References Cited

U.S. PATENT DOCUMENTS

| | | | | |
|---|---|---|---|---|
| 2003/0001889 A1* | 1/2003 | Darby | | 345/752 |
| 2003/0195895 A1* | 10/2003 | Nowicki et al. | | 707/100 |
| 2004/0123032 A1* | 6/2004 | Talagala et al. | | 711/114 |
| 2005/0198166 A1* | 9/2005 | Kawaji | | 709/206 |
| 2005/0203864 A1* | 9/2005 | Schmidt et al. | | 707/1 |
| 2006/0190830 A1* | 8/2006 | Gerstl et al. | | 715/757 |
| 2006/0212528 A1* | 9/2006 | Tonegawa | | 709/206 |
| 2007/0033430 A1 | 2/2007 | Itkis et al. | | |
| 2007/0067332 A1 | 3/2007 | Gallagher et al. | | |
| 2007/0088674 A1* | 4/2007 | Kawate et al. | | 707/2 |
| 2007/0150481 A1* | 6/2007 | Song et al. | | 707/10 |
| 2007/0160198 A1 | 7/2007 | Orsini et al. | | |
| 2007/0214105 A1* | 9/2007 | Sfarti et al. | | 707/2 |
| 2007/0226224 A1* | 9/2007 | Wanigasekara-Mohotti et al. | | 707/10 |
| 2008/0028017 A1* | 1/2008 | Garbow et al. | | 709/201 |
| 2008/0046614 A1* | 2/2008 | Aridome et al. | | 710/65 |
| 2008/0069091 A1 | 3/2008 | Cohen et al. | | |
| 2008/0183824 A1* | 7/2008 | Chen et al. | | 709/206 |
| 2008/0256188 A1* | 10/2008 | Massand | | 709/206 |
| 2008/0263113 A1* | 10/2008 | Krishnaiyer et al. | | 707/205 |
| 2009/0094320 A1* | 4/2009 | Palthepu et al. | | 709/203 |
| 2009/0282086 A1* | 11/2009 | Heimes | | 707/200 |
| 2010/0058476 A1* | 3/2010 | Isoda | | 726/26 |
| 2010/0106907 A1* | 4/2010 | Noguchi et al. | | 711/114 |

(Continued)

OTHER PUBLICATIONS

Using Free Web Storage for Data Backup, Traeger et al., ACM 2006.*

(Continued)

*Primary Examiner* — Augustine K Obisesan
(74) *Attorney, Agent, or Firm* — Law Offices of Ira D. Blecker, P.C.

(57) ABSTRACT

A method is provided for storing a file as slices on storage elements. A computer having memory and at least one computer processor receives a request to store a file. The file is split into slices. A respective header is generated to individually identify each one of the slices. Emails are generated and for each email: an email body includes one of the slices and an email subject line includes the respective header. Each of the emails is stored on storage elements. First metadata is generated for the file, and the first metadata includes information to reconstruct the file from the slices.

15 Claims, 10 Drawing Sheets

U.S. PATENT DOCUMENTS

| | | | |
|---|---|---|---|
| 2010/0131609 A1* | 5/2010 | Tonegawa et al. | 709/206 |
| 2010/0169391 A1* | 7/2010 | Baptist et al. | 707/827 |
| 2010/0191818 A1* | 7/2010 | Satterfield et al. | 709/206 |

OTHER PUBLICATIONS

Structure Ontology and IR for Email Search & Discovery, Eklund et al, Proceedings of the sixth Australasian Document Computing Symposium, Australia, Dec. 7, 2001.*

GSsplit, Retrives from web at http://www.gdgsoft.com/gsplit.*

A comprehensive system for computer-aided metadata generation, Hatala et al, WWW 2003, May 20-24, 2003, Budapest, Hungary.*

Mailbox File Formats, retrieved from http://cyrusimap.web.cmu.edu/docs/cyrus-imapd/2.4.6/internal/mailbox-format.php.*

Strategies for Reprocessing Aggregated Metadata, Foulonneau et al., ECDL 2005, LNCS3652, pp. 290-301, 2005.*

Design and Implementation of a Middleware for Data Storage in Opportunistic Grids, de Camargo et al., Seventh IEEE International Symposium on Cluster Computing and the Grid (CCGrid'07).*

JigDFS: A Secure Distributed File System, Bian et al, IEEE Symposium on Computational Intelligence in Cyber Security (CICS), Apr. 2009, pp. 76-82, Nashville, Tennessee, USA.*

* cited by examiner

TABLE 1

| Administrative processor module: | Service responsible for routing tasks received from the Requests Interface.<br>Based upon the tools configuration information, it controls the user access levels.<br>Routes a file store request from the Requests Interface to the Metadata Generator.<br>Routes a file store result received from the Metadata Generator to the Requests Interface.<br>Retrieves file restore parameters from the Metadata database.<br>Routes a file restore request from the Requests Interface to the Document Requester.<br>Routes a file restore result from the Document Requester to the Requests Interface.<br>Routes a file delete request from the Requests Interface to the e-mail servers / storage system.<br>Routes a file delete result from the e-mail servers / storage system to the Requests Interface.<br>Keeps a list of on-line/trusted: Storage systems, Metadata databases, Metadata Generator, and Document Requester service providers. |
|---|---|
| Decryption module: | Provides a decryption service to the WebStorage system.<br>Receives a decryption request from De-Splitter.<br>Retrieves the decryption method from the Metadata database (optional step).<br>Decodes the encrypted file.<br>Sends a decryption result to the Document Requester.<br>Forwards the decoded file to the requests interface. |
| De-splitter and Garbage collector: | De-splitter service is responsible for the encrypted file reconstruction.<br>Receives slices from the Storage System.<br>When a garbage slice is found, the garbage slice is discharged.<br>The slice 'header' is discharged, leaving only the remaining binary code of the slice.<br>The binary code is queued in order.<br>The encrypted file is reassembled after all slices are recovered.<br>A slices received result is returned to the Document Requester.<br>The encrypted file is forwarded to the Decryption module. |

FIG. 5

| | |
|---|---|
| Document requester: | Exchanges services and employs the information stored in the Metadata database.<br>Controls and logs the file recovering activities to ensure its traceability.<br>Receives from the Administrative processor module a file restore request.<br>Routes the file slices from the storage system to the available De-Splitter service.<br>Keeps a list of on-line/trusted De-splitter and Decryption service providers.<br>Provides a keep alive signal to the Administrative Processor. |
| E-mail account management (which can be implemented in the Administrative processor module): | Provides to the Administrative processor a service to manage the e-mail accounts/storage accounts.<br>Inserts/deletes e-mail/storage servers in the system.<br>Inserts/deletes e-mail/storage accounts in the system. |
| E-mail header generator (Redundancy and Garbage): | Responsible for message encapsulation, and puts a header in each file slice.<br>In charge of routing a file slice to more than one place (redundancy) and creating fake file slices (garbage).<br>Receives from the Splitter module a slice store request.<br>Randomly and based upon the <header_parameters>, the garbage generator creates a dummy message that will be stored as a valid document also.<br>Provides a keep alive signal to the Metadata Generator. |
| E-mail servers and/or storage services: | Equipment/services responsible for data storage.<br>Store/Recover data and/or e-mails. The storage device may, e.g., be a POP / IMAP account, and/or a paid or free account storage service. The storage device may "plugin-able".<br>Receive a store slice command from the e-mail header generator.<br>Send a store slice acknowledge to the e-mail header generator. |

TABLE 2

FIG. 6

TABLE 3

| | |
|---|---|
| Encryption Module: | Provides an encryption service. Receives from the Metadata Generator a file encryption request. Based upon the received parameters, the file is encrypted. Returns an encryption result to the Metadata Generator. Forwards the encrypted file to the Splitter. Provides a keep alive signal to the Metadata Generator. Sends an encryption done message to the Metadata Generator. |
| Metadata Database (Db): | Service to provide the data of the data. It contains where and how a file was spread in the email / storage servers. Offers a service to store document information (# of slices, where they were stored in, cryptography method and general file system status information). Offers a service to store e-mail servers' identification and user's information. Since the Metadata database is a file it also can be stored in the Web Storage tool, split into slices, and distributed for storage on different emails servers/storage systems. |
| Metadata Generator: | Provides exchanging services for controlling the storing service, ensuring that all storing services are traceable, and logging all transactions in the Metadata database. Receives the document from the Administrative processor module with its parameters defined in a tool configurator. Stores file parameters in the Metadata database (such as file owner, size, creation date, and so on). Routes the document to the encryption module. Stores the encryption result in the Metadata db. Sends file split parameters to the Encryption module. Sends the <header_parameters> to the Splitter. Based upon tool configurator, the Metadata Generator configures the redundancy and garbage generator in the e-mail header generator. Updates the slice 'sent message' result in the Metadata db. Returns a file store result to the Administrative processor module. Keeps a list of on-line/trusted encryption, splitter and e-mail header generator service providers. Provides a keep alive signal to the Administrative processor module. |

FIG. 7

TABLE 4

| Requests Interface: | Provides a user interface service.<br>"Plugin-able" GUI that receives solicitations to store and recover documents or files. It also provides a GUI for Administrative processor / Tool configurator / e-mail account management. Examples: A drag'n drop icon in the desktop allowing a file to be easily stored, a SameTime plugin, and a cell phone interface. Also, an interface to accept/recover any kind of data streaming like one originated from several sensors and/or transducers in a chemical plant or either from a broadcast TV show.<br>A Requests Interface may log into an available Administrative processor service provider. |
|---|---|
| Splitter: | Provides a service to Split a file in slices.<br>Receives from the Encryption Module a file split request.<br>Based upon split_parameters, a file is sliced.<br>Stores the file split result in the Metadata Generator.<br>Forwards file slices to the Email Header generator.<br>Provides a keep alive signal to the Metadata Generator.<br>Sends a split done message to the Encryption Module. |
| Tool Configurator (which can be integrated with the Administrative processor module: | It is a WebStorage configuration / configurable file that controls the behavior of the WebStorage Tool. It stores information including:Information if a document should be encrypted; Number of splits that a file should have; Redundancy level (0 - no redundancy, 1- one copy of each file slice, 2 - two copies of each file slice, 3... n); Garbage generation (none, random....); Number of servers to use, name of servers, and address of servers (1, 2, 3 ... n e-mail servers); Servers type (IMAP, POP, Storage system...); Access control list, and Keeps a Trusted service providers list. |

WEB DISTRIBUTED STORAGE SYSTEM

BACKGROUND OF THE INVENTION

The present invention relates to data storage, and more specifically, to distributing portions of data for storage on email servers and/or storage systems.

The increase in the amount of data generated by businesses and the importance of the ability of a business to retrieve the information reliably has put a greater demand on data storage systems. Information technology professionals desire a data storage system that can efficiently handle and store vast amounts of data generated by the business. As well, individuals desire a data storage system that can efficiently handle and store personal data in a safe and secure manner, without high costs.

Moreover, the data needs to be safe from theft or corruption and stored in a manner that provides rapid accessibility. The data storage system should also make efficient use of current information technology resources of the business/individual and not put additional strain on the bottom line of the business or a burden on the individual.

BRIEF SUMMARY OF THE INVENTION

In accordance with exemplary embodiments, a method, implemented on a computer, for storing a file as slices on storage elements is provided. A computer having memory and at least one processor receives a request to store a file. The file is split into slices. A respective header is generated to individually identify each one of the slices. A plurality of emails are generated, where for each email of the plurality of emails, an email body includes one of the slices and an email subject line includes the respective header. Each of the plurality of emails is stored on storage elements. First metadata is generated for the file, and the first metadata includes information to reconstruct the file from the slices.

In accordance with exemplary embodiments, a method implemented on a computer for restoring a file that has been split into slices for storage is provided. A computer having memory and at least one processor receives a request to retrieve a file. Restore parameters are retrieved from a first metadata corresponding to the file. Slices of the file are retrieved from a plurality of email bodies of a plurality of emails based on the restore parameters. The slices of the file are reconstructed to a restored file based on the restore parameters. Computer program products for the above methods are provided in accordance with exemplary embodiments. Also, additional features are realized through the techniques of the exemplary embodiments. Embodiments are described in detail herein and are considered a part of the claimed invention. For a better understanding of features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of exemplary embodiments are apparent from the following detailed description taken in conjunction with the accompanying drawings in which:

FIGS. 4, 5, 6, and 7 illustrate Tables 1, 2, 3, and 4 generally describing elements in accordance with exemplary embodiments;

DETAILED DESCRIPTION OF THE INVENTION

Although data storage is a service that allows someone to store and recover a file employing a password, exemplary embodiments provide that after encoding a file, the file is split into little pieces of data and distributed among several storage systems such as, e.g., e-mail servers and/or storage systems. This distribution makes it very difficult for a server administrator or for someone to grab and decode a file because the stolen file can be incomplete, encoded, out of order, "garbaged" and/or without its decryption keys.

Exemplary embodiments allow for changing services independent of the employed hardware, independent of the employed software, and independent of the geographic location. After enciphering (encrypting) a file, a file is sliced and distributed among several simple e-mail accounts, email servers or proprietary storage systems, and a metadata document is generated for document recovering purposes.

A file can be spread around the world. Unless someone has access to the metadata document and to the file decryption key, it is not possible to restore the original data. Also, to increase security of the storage system, the metadata database can be stored by splitting it into pieces of data and distributing the metadata database among several storage services such as, e.g., e-mail servers and/or storage systems.

Figure 1:
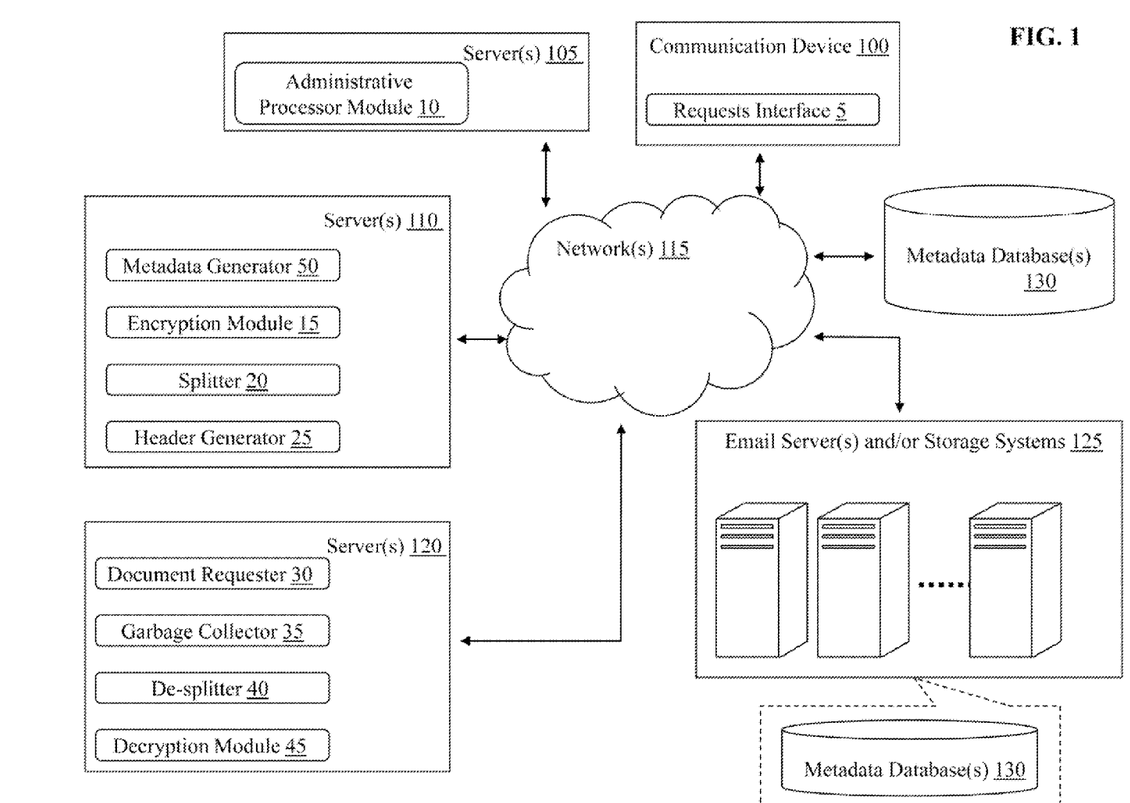
FIG. 1 illustrates an architecture for archiving and restoring files in accordance with exemplary embodiments.

Now turning to FIG. 1, FIG. 1 illustrates an architecture for archiving and restoring files in accordance with exemplary embodiments. It is understood that the architecture illustrated in FIG. 1 is only for explanatory purposes and exemplary embodiments are not meant to be limited by the architecture shown in FIG. 1. The architecture illustrates an infrastructure through which users can archive and store files having any type of data. Various features, processes, modules, interfaces, hardware/software components, and services discussed herein may collectively be referred to as a web storage system and/or a web storage tool for explanation purposes. The various features, processes, modules, interfaces, hardware/software components, and services communicate with one another using standards and protocols known in the art, such as a Service Oriented Architecture (SOA, which is an architectural style that provides coupling among interacting software/hardware agents) protocol, Internet protocols (such as TCP/IP), etc.

In the following scenario, archiving a file will be discussed with reference to FIG. 1. A user utilizes a requests interface 5 of a communication device 100 to request to store a file. The requests interface 5 transmits the request to store the file to an administrative processor module 10 of a server 105 via a network 115. The administrative processor module 10 routes the store request to a metadata generator 50 of a server 110. It is contemplated that the administrative processor module 10 on the server 105 may receive requests from the communication device 100 either to establish a service account or to access network services for archiving or restoring files. The administrative processor 10 may implement authentication software for restricting or controlling access to archiving and restoring services discussed herein. The administrative processor module 10 on the server 105 may be in communication with a customer identity system (CIS) database (not shown), which stores user credentials (e.g., user names and passwords), along with account records.

The metadata generator 50 receives parameters (defined in a tool configurator) from the administrative processor module 10. The tool configurator may be implemented in the administrative processor module 10, or the tool configurator may be a separate module from the administrative processor module 10. The metadata generator 50 generates metadata (for the file) that is used to restore the file, controls the storing service, ensures that all storing is traceable, and logs all transactions in a metadata database 130. The metadata itself may be, e.g., an XML file or any other suitable file. The metadata generator 50 routes the file to an encryption module 15.

The encryption module 15 receives the file encryption request and parameters from the metadata generator 50. Based on the received parameters, the file is encrypted by the encryption module 15. The encryption module 15 returns an encryption result to the metadata generator 50, provides a keep alive signal to the metadata generator 50, and sends an encryption done message to the metadata generator 50. The encryption module 15 may forward the encrypted file to a splitter 20.

The splitter 20 receives a file split request from the encryption module 15. Based on split parameters, the encrypted file is sliced into slices by the splitter 20. The splitter 20 transmits the file split result to the metadata generator 50. Also, the splitter 20 forwards the file slices to an email header generator 25, provides a keep alive signal to the metadata generator 50, and sends a split done message to the encryption module 15.

The email header generator 25 receives a slice store request from the splitter 20. The header generator 25 is responsible for email message encapsulation of the file slices. The header generator 25 puts a header such as a subject line with each file slice to be saved as an email message in, for example, email servers and/or storage systems 125. For redundancy, the header generator 25 is responsible for routing the same file slice to more than one place. For example, the header generator 25 can route the same file slice to one email server and/or storage system 125 at a particular geographical location and to a different email server and/or storage system 125 located at a different geographical location. Accordingly, the same file slice might be sent to different servers 125 and if one server fails, other servers 125 can supply the missing data (i.e., file slice). As discussed herein, the email servers and/or storage systems 125 in FIG. 1 represent numerous servers and storage systems which may be located at various locations and/or numerous servers and storage systems which may be co-located.

Further, the header generator 25 may incorporate a garbage generator (not shown) for creating fake slices as garbage. Randomly and/or based upon header parameters, the header generator 25 via the garbage generator creates a dummy email message that will be stored as a valid file slice. The dummy garbage messages may be random data that have a header like the real file slices. Although file slices may be stored in email messages identified with a respective header, it is understood that the header generator 25 may provide a header and encapsulate the file slices as instant messages. Also, the header generator 25 may store some file slices as email messages on email servers and/or storage systems 125 and may store other file slices on instant messaging servers (not shown) for the same file or different files.

Also, the header generator 25, based upon received parameters (e.g., from the splitter 20) provides the key (e.g., of a public key/private key scheme for decrypting the file) for file recovery to the requests interface 5 of the communication device 100. If no parameters were received, a default parameter will be employed by the header generator 25. The header generator 25 provides a keep alive signal to the metadata generator 50.

Now, restoring a file from its various file slices is discussed with reference to FIG. 1. A user may utilize the requests interface 5 to log into the administrative processor module 10. Using a file key or password, the requests interface 5 makes a file restore request to the administrative processor module 10. The administrative processor module 10 routes the file restore request to a document requester 30 of the server 120. The document requester 30 controls and logs the file recovery activities to ensure traceability of the file recovery activities. The document requester 30 receives the file restore request and retrieves metadata for the file from the metadata database 130. Using the parameters in the metadata, the document requester 30 routes the file slices for the requested file in the email servers and/or storage systems 125 to a de-splitter 40. The document requester 30 can cause the file slices (which may be encapsulated in email messages) to be read from the email servers and/or storage systems 125 directly to the de-splitter 40, regardless of whether email servers, storage devices, and/or a combination of both are used to store the file slices. Also, if there happens to be any missing file slices needed to recover the file, the document requester 30 is responsible for determining and recovering any missing file slices using redundancy, since the same file slices are stored on different email servers 125. The document requester 30 keeps a list of on-line trusted de-splitter and decryption service providers.

Using the metadata from the metadata databases 130, the de-splitter 40 reconstructs the sliced encrypted file from the file slices. For example, when file slices are received from the email server and/or storage systems 125, the de-splitter 40 in cooperation with a garbage collector 35 determine if garbage slices are found, and if found, the garbage slices are discarded. For the remaining file slices, the de-splitter 40 discards the file slice header leaving only, for example, a binary code of the file slice. The de-splitter 40 queues the binary code from each file slice in order. For example, the de-splitter 40 is configured to extract the data of each file slice from the body of the email messages, and the de-splitter 40 compiles each file slice in the proper order. The de-splitter 40 reassembles the encrypted file after all the file slices are recovered, returns a file slices received result to the document requester 30, and forwards the encrypted file to a decryption module 45.

The decryption module 45 receives the encrypted file from the de-splitter 40 and retrieves the decryption method from the metadata database. Although the document requester 30 and the de-splitter 40 can recover an encrypted file, exemplary embodiments are configured so that the document requester 30 and the de-splitter 40 do not have access to the decryption method. The decryption module 45 decodes the encrypted file using the decryption method and routes the decoded file to the requests interface 5 of the communication device 100. The user of the communication device 100 is able to access the restored file via the requests interface 5.

In accordance with exemplary embodiments, for each sliced file, the metadata database 130 may include information about the file, information about splits and file slices, information about email accounts, information about addresses to email servers and/or storage services, and information about header identifications.

In FIG. 1, it is understood that in exemplary embodiments and implementations, the communication device 100 can be a variety of other communication devices, such as general purpose or laptop computers, wireless devices such as cellular telephones and smart phones, portable computing devices, digital music players (for example, MP3 players), personal digital assistant (PDA), mobile devices, digital televisions, etc. According to exemplary embodiments, the architecture includes the communication device 100 as discussed above, which can also be an IP enabled television communicatively coupled to a set top box for accessing the network 115, such as but not limited to the Internet. The network 115 may include circuit-switched and/or packet-switched technologies and devices, such as routers, switches, hubs, gateways, etc., for facilitating communications among the communication device 100, server 105, server 110, server 120, email servers and/or storage systems 125, and metadata database 130. The network 115 may include wireline and/or wireless components utilizing, e.g., IEEE 802.11 standards for providing over-the-air transmissions of communications.

In exemplary embodiments, the network 115 can be a managed IP network administered by a service provider, which can control bandwidth and quality of service for the communications discussed herein. The network 115 may be implemented in a wireless fashion, e.g., using wireless protocols and technologies, such as WiFi, WiMax, BLUETOOTH, etc. The network 115 can also be a packet-switched network, such as a local area network, a wide area network, a metropolitan area network, an Internet network, or other similar types of networks. The network 115 may be a cellular communications network, a fixed wireless network, a wireless local area network (LAN), a wireless wide area network (WAN), a personal area network (PAN), a virtual private network (VPN), an intranet or any other suitable network, and the network 115 may include equipment for receiving and transmitting signals, such as a cell tower, a mobile switching center, a base station, a wireless access point, and a satellite.

The servers 105, 110, 120, and the email servers and/or storage systems 125 may be implemented using a high-speed processing device (e.g., a computer system) that is capable of handling high volume activities conducted over the network 115.

Furthermore, exemplary embodiments are not limited to but are capable of being implemented in the architecture illustrated in FIG. 1. Additionally, the servers 105, 110, and 120 may be representative of numerous servers. The email servers and/or storage systems 125 may be representative of numerous email servers and/or storage systems 125. Likewise, the network 115 may be representative of numerous networks, and the communication device 100 may be representative of numerous communication devices. Therefore, the architecture illustrated in FIG. 1 is neither limited numerically to the elements depicted therein nor limited to the exact configuration and operative connections of elements. Further, it is understood by those skilled in the art that elements may be added to, subtracted from, or substituted for the elements described in the architecture of FIG. 1. It is also understood that each module (for example, requests interface 5, administrative processor module 10, encryption module 15, splitter 20, header generator 25, document requester 30, garbage collector 35, de-splitter 40, and decryption module 45) may reside and be implemented on individual high speed processing devices or be implemented on a single high speed processing device.

Figure 2:
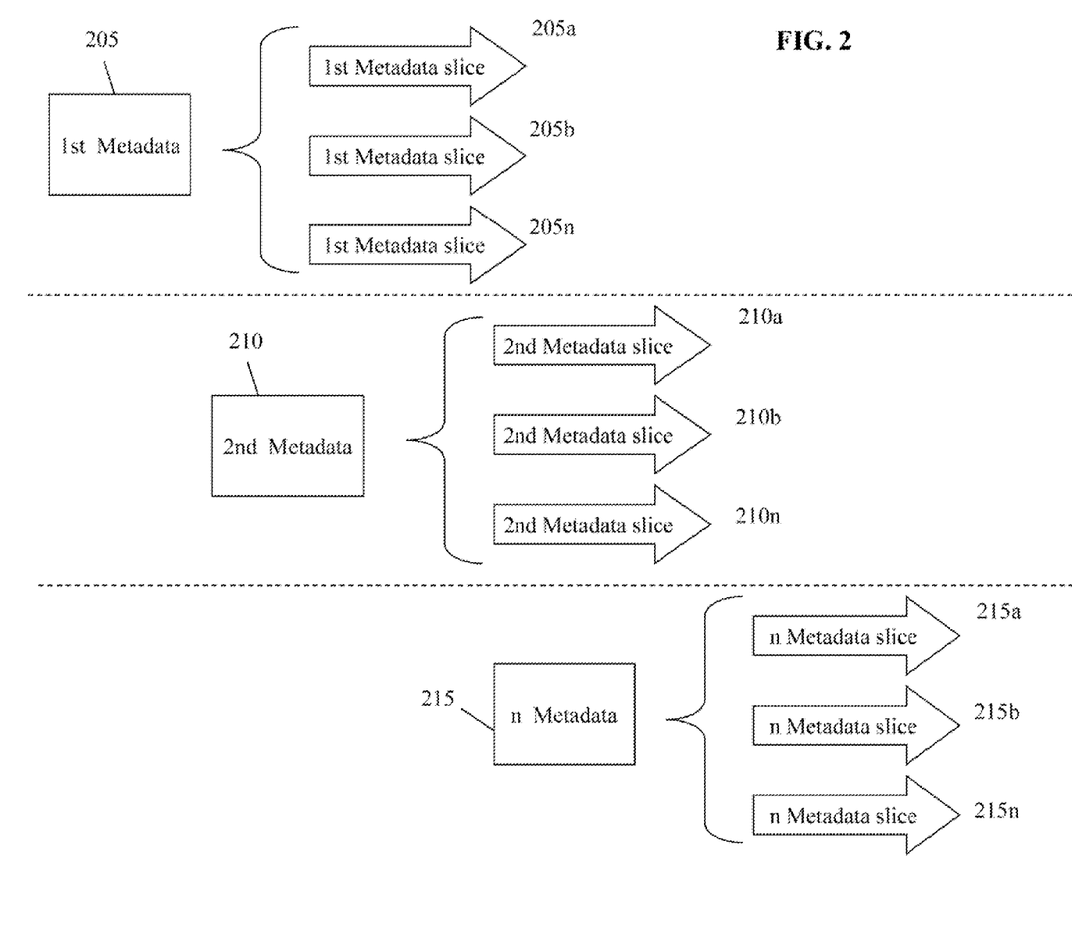
FIG. 2 is a block diagram illustrating splitting metadata in accordance with exemplary embodiments.

FIG. 2 illustrates splitting metadata in accordance with exemplary embodiments. For explanatory purposes, metadata is described in FIG. 2 as $1^{st}$ metadata 205, $2^{nd}$ metadata 210, and through n metadata 215, where $1^{st}$ metadata 205 is information about splitting and restoring the file slices, where $2^{nd}$ metadata 210 is information about splitting and restoring the $1^{st}$ metadata 205, where n metadata 215, which represents a last metadata is information about splitting and restoring n−1 metadata which represents metadata next to the last metadata, such as a $1^{st}$, $2^{nd}$, $3^{rd}$, $4^{th}$, $5^{th}$, $6^{th}$ ... metadata. Also, it is understood that the $2^{nd}$ metadata 210 may also include information about splitting and restoring the file slices, along with information about splitting and restoring $1^{st}$ metadata 205; this is also true for any subsequent metadata through n metadata 215.

FIG. 2 illustrates a $1^{st}$ metadata 205 that includes various parameters for restoring file slices of a file. With reference to FIG. 1, the $1^{st}$ metadata 205 may be sent by the metadata generator module 50 to the splitter 20. The splitter 20 receives the $1^{st}$ metadata 205 and splits the $1^{st}$ metadata 205 into $1^{st}$ metadata slices 205a, 205b, 205n which represents a last $1^{st}$ metadata slice shown in FIG. 2. The splitter 20 sends the $1^{st}$ metadata slices 205a, 205b, and 205n to the header generator 25. For the $1^{st}$ metadata slices 205a, 205b, and 205n, the header generator 25 creates individual headers, creates individual email messages, provides the addresses for the email messages, inserts the respective $1^{st}$ metadata slices 205a, 205b, and 205n in the body of the email messages, and transmits the email messages to respective email servers and/or storage systems 125 (see FIG. 3).

In FIG. 2, information regarding splitting and restoring $1^{st}$ metadata 205 is stored in $2^{nd}$ metadata 210, and/or the $2^{nd}$ metadata 210 may include information for restoring the file slices of the file. The $2^{nd}$ metadata 210 may be sent from the metadata database 130 to the splitter 20 by the metadata generator module 50, and the splitter 20 divides the $2^{nd}$ metadata 210 into $2^{nd}$ metadata slices 210a, 210b, and 210n. The $2^{nd}$ metadata slices 210a, 210b, and 210n are sent by the splitter 20 to the header generator 25. As discussed herein, the header generator 25 creates individual headers, creates individual email messages, provides the addresses for the email messages, inserts the respective $2^{nd}$ metadata slices 210a, 210b, and 210n in the body of the email messages, and transmits the email messages to respective email servers and/or storage systems 125 (see FIG. 3).

Likewise, n metadata 215 comprises information regarding splitting and restoring n−1 metadata, and for the sake of this example, n−1 metadata will be the $2^{nd}$ metadata 210. It is understood by one skilled in the art that there may be numerous metadata before n metadata 215, and exemplary embodiments are not limited to the $2^{nd}$ metadata being immediately before n metadata 215. Additionally, n metadata may include information for restoring the file slices of the file. In one example, n metadata 215 may not be split and may be stored in the metadata database 130 and/or the emails servers and/or storage systems 125. In another example, n metadata 215 may be split into n metadata slices 215a, 215b, and 215n so that respective emails messages can be created and stored for n metadata slices 215a, 215b, and 215n according to exemplary embodiments. When n metadata 215 is split into n metadata slices 215a, 215b, and 215n, an additional metadata (not shown) may be generated by metadata generator 50 to store information regarding splitting and restoring the n metadata 215. In accordance with exemplary embodiments, it is contemplated that the $1^{st}$ metadata slices 205a, 205b, and 205n of the $1^{st}$ metadata 205, the $2^{nd}$ metadata slices 210a, 210b, and 210n of the $2^{nd}$ metadata 21a, and n metadata slices 215a, 215b, and 215n of n metadata 215 may be reconstructed and restored in accordance with the processes discussed herein for restoring files from file slices.

Figure 3:
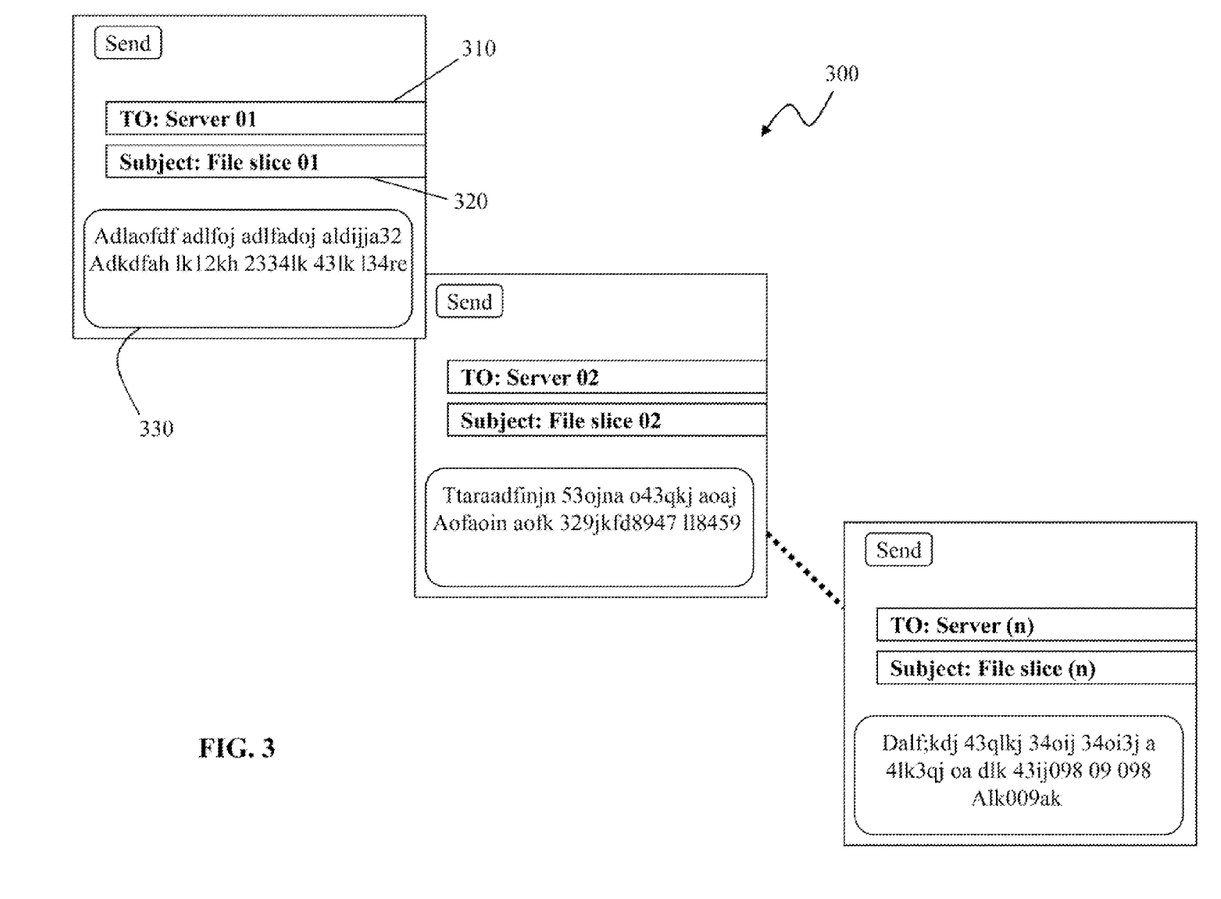
FIG. 3 illustrates an example of slices of data being incorporated in messages in accordance with exemplary embodiments.

FIG. 3 illustrates an example of slices of data being incorporated in messages 300 in accordance with exemplary embodiments. The example discusses file slices, but as discussed herein, one skilled in the art understands that the slices of data may be instant message slices, metadata slices, etc.

With reference to FIG. 3, the header generator 25 is configured to select an appropriate server and/or storage system 125 as the address in the address box 310. The header generator 25 creates an appropriate header in a subject box 320 for the file slice and inserts the file slice in the email body 330 of one of the email messages 300. For example, for the first file slice, the header generator 25 may select the address of server 01 to input in the address box 310 and creates a header file slice 01 to input in the subject box 320. The header generator 25 adds the file slice data (for example, binary code) in the email body 330 of the email message 300.

The header generator 25 can create as many email messages 300 as needed for each file slice of the file. For example, the header generator 25 creates the email message 300 that is addressed to server n, with a header file slice n and inputs the corresponding file slice data in the email body 330. In FIG. 3, there is no limitation with regard to the address of servers 01 through n. For example, some file slices for a file may be sent to servers at different geographical locations, to different servers at the same location, and/or to servers managed by different entities all across the world. Additionally, some file slices may be sent to different partitions of a server.

Also, in accordance with exemplary embodiments, the messages 300 may be instant messages that are created and sent by header generator 25 to various instant messaging servers, and the instant messages may utilize the address box 310, the subject box 320 and/or email body 330 as shown in FIG. 3.

Tables 1, 2, 3, and 4 are respectively illustrated in FIGS. 4, 5, 6, and 7. Tables 1, 2, 3, and 4 provide a general description of elements utilized in exemplary embodiments. Although elements in Tables 1, 2, 3, and 4 are designated as having certain responsibilities, services, and features, it is understood by one skilled in the art that the particular responsibilities, services, and features of any element may be shared with, integrated with, and/or independent from any other element discussed herein.

As discussed herein, exemplary embodiments provide redundancy so that the same file slice can be sent to different servers. If one server fails, other servers can supply the missing data. Exemplary embodiments provide speed and download/load balancing, since it is possible to recover parts (for example, file slices) of the file from different servers. Exemplary embodiments can also use existing Internet infrastructure, and there is no need to change the existing storage services structure or email services, because email services are only utilized for sending/receiving messages and storage systems are only sending/receiving files. Further, in accordance with exemplary embodiments all modules (such as the document requester 30, splitter 20, metadata generator 50, etc.) of the web storage tool are services, and exemplary embodiments provide service redundancy. For example, if a module (service) is off line, exemplary embodiments can route the slice or file to a trusted and available service provider in place of the service (module) that is off line. In other words, if any file slice is lost or if any specific service provider is off line, exemplary embodiments provide redundancy for each file slice and redundancy for each service. Service redundancy may be implemented in a service oriented architecture.

Further, with regard to security, since the file is enciphered (encrypted), the file contents (such as file slices) will not be indexed by an unauthorized search mechanism. Also, the user (for example, of the communication device 100) may not have direct access to the data or to the metadata, and the decryption keys are held by the file owner (which may be the user). So even if an unauthorized metadata database administrator attempted to reassemble a file, decryption is not possible because decryption keys are held by the file owner (for example, the user of communication device 100).

Figure 8:
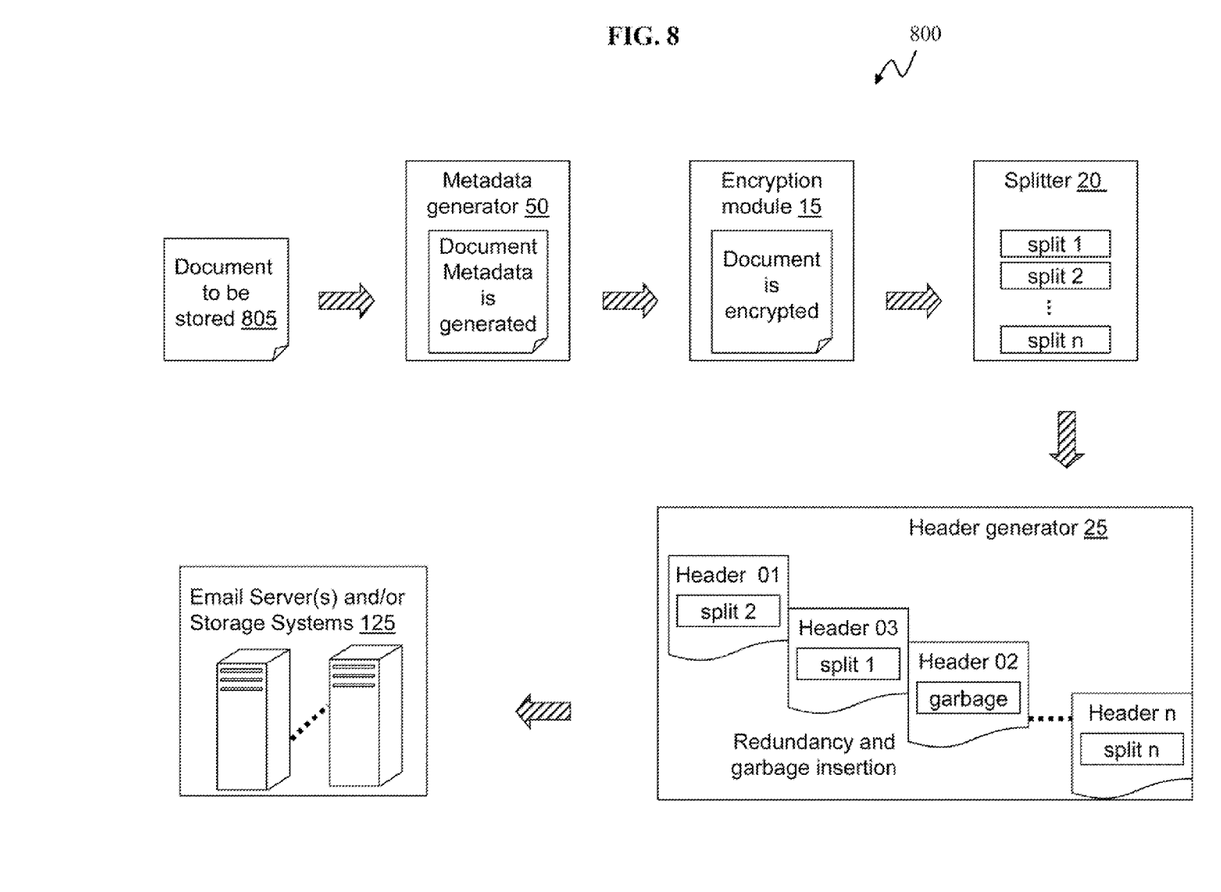
FIG. 8 is a flow chart illustrating archiving files in accordance with exemplary embodiments.

FIG. 8 is a flow chart 800 illustrating archiving files in accordance with exemplary embodiments. The striped arrows in the flow chart 800 illustrate the flow of a process for storing a document 805 as file slices in accordance with exemplary embodiments. Herein, the terms document and file may be used interchangeably to represent data that can be archived and restored according to exemplary embodiments.

A user utilizing the communication device 100 may log into the requests interface 5, and the requests interface 5 in turn logs into the administrative processor module 10 residing on the server 105. The administrative processor module 10 responds to the requests interface 5 with a logon acceptable indication. The user is allowed to store the document 805 via the requests interface 5. The requests interface 5 transmits the document 805 (for example, a file) and its related information to the administrative processor module 10. The administrative processor module 10 determines an available metadata generator 50 to receive the document 805 and its related information. The metadata generator 50 generates metadata for the document 805 and stores the metadata in the metadata database 130, such as a metadata database of a trusted metadata database service. The metadata generated by the metadata generator 50 may include, for example, file (document) name, file size, creation date of metadata, etc. The metadata generator 50 receives a done response from the metadata database 10. The metadata generator 50 transmits the document 805 for encoding, along with optional encryption parameters, to the available encryption module 15.

The encryption module 15 encrypts the document 805 and transmits the encrypted file name and encryption result to the metadata generator 50. The metadata generator 50 transmits the encryption result, encrypted file name, owner of the encrypted file, size of the encrypted file, and creation date to the metadata database 130. The metadata generator 50 receives a done response from the metadata database 130. In response to the metadata generator receiving the encrypted file name, split parameters are supplied to the encryption module 15 from the metadata generator 50. The encryption module 15 transmits the encrypted document 805 and split parameters to the available splitter 20.

In response to receiving the encrypted document 805 and its split parameters, the splitter 20 splits the encrypted document 805 into file slices based on the received split parameters. If, for example, no split parameters were received by the splitter 20, the splitter 20 may be configured to split the encrypted document 805 into file slices in accordance with predefined parameters of the splitter 20. The splitter 20 transmits the encrypted file name, file slices information, and a split done message to the metadata generator 50, and in response to the metadata generator receiving this information, the metadata generator 50 transmits the header parameters to the splitter 20. The splitter 20 transmits the file slices and header parameters to the header generator 25, and the header generator 25 responds to the splitter 20 with a slices received message.

Based on the header generator parameters, the header generator 20 generates the proper header for a message for each file slice, provides an address to and determines each email server and/or storage system 125 that is to receive each file slice in a message, inserts the garbage in dummy messages with appropriate headers, and provides redundancy so that the same file slice can be duplicated in a different message and stored on a different email server and/or storage system 125 from the original file slice.

The header generator 25 transmits the file slices in individual messages to the available email servers and/or storage systems 125. In response to receiving the file slices, the email servers and/or storage systems 125 transmit an acknowledgement to the header generator 25. The header generator 25 transmits the slices information and a store result to the metadata generator 50, and in response, the metadata generator 50 transmits slices sent result message to the metadata database 130. In response to receiving an acknowledgement from the metadata database 130, the metadata generator 50 indicates a file store result message to the administrative processor module 10. The administrative processor module 10 informs the user that the document 805 was archived via the requests interface 5.

Figure 9:
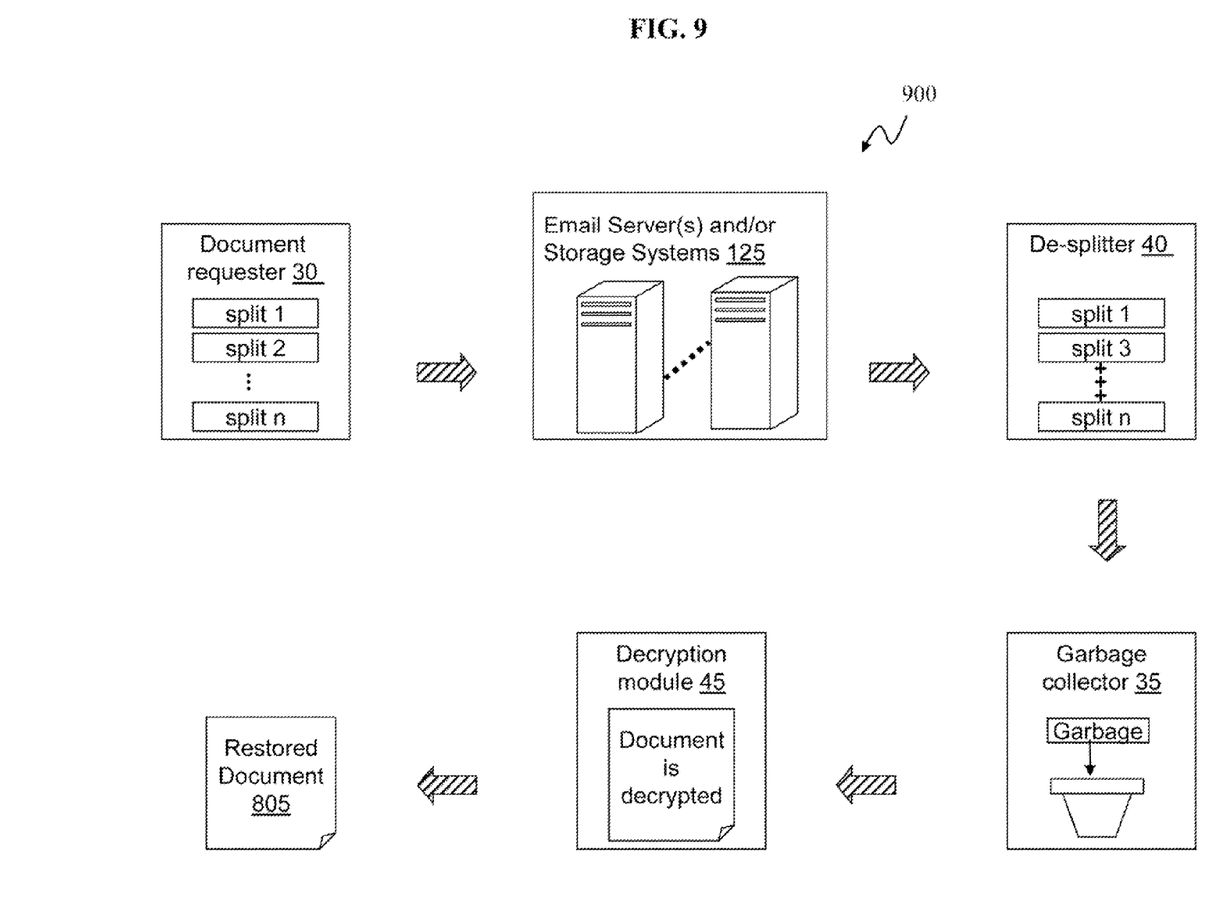
FIG. 9 is a flow chart illustrating restoring files in accordance with exemplary embodiments.

FIG. 9 is a flow chart 900 illustrating restoring files in accordance with exemplary embodiments. The striped arrows in the flow chart 900 illustrate the flow of a process for reconstructing and restoring the stored document 805 in accordance with exemplary embodiments.

A user utilizing the communication device 100 may log into the requests interface 5, and the requests interface 5 in turn logs into the administrative processor module 10 residing on the server 105. The administrative processor module 10 responds to the requests interface 5 with a logon acceptable indication. The user is allowed to request that the document 805 be restored via the requests interface 5. The requests interface 5 transmits the file name and request for restoration of the document 805 to the administrative processor module 10.

Using the received file name, the administrative processor module 10 retrieves the restore parameters for the document 805 from the metadata database 130. The administrative processor module 10 selects the available document requester 30 and transmits the file name and restore parameters to the available document requester 30. Using the received restore parameters, the document requester 30 transmits a get slices message to the email servers and/or storage systems 125. For example, if the file slices (for example, as email messages) for the document 805 are stored on 25 different email servers and/or storage systems 125, the document requester 30 requests the corresponding file slice from each respective email server and/or storage system 125.

The email servers and/or storage systems 125 each transmits respective file slices to the available de-splitter 40. The de-splitter 40 receives each file slice and transmits a slices received message to the document requester 30. Based on the restore parameters, the de-splitter 40, via a garbage collector 35 that may be integrated with and/or separate from the de-splitter, determines whether there are any garbage files in dummy messages, and if there are garbage files, the de-splitter 40, via the garbage collector 35, discards the garbage files in the dummy messages. Based on the restore parameters, the de-splitter 40 reconstructs the encrypted document from the received file slices. The de-splitter 40 transmits the encrypted document to the decryption module 45.

The decryption module 45 receives the encrypted document and transmits an encrypted file received message to the document requester 30. The decryption module 45 requests and retrieves the decryption method from the metadata database 130 for the encrypted document. The decryption module 45 may use the decryption key or any other decryption method retrieved from the metadata database 130 to decrypt the encrypted document, and the decryption module 45 provides the restored document 805 to the requests interface 5 of the communication device 100 for the user. The decryption module 45 transmits a decryption result message to the documents requester 30. The document requester 30 transmits a restore result message to the administrative processor module 10, and the administrative processor module 10 transmits a restore result message to the requests interface 5.

Figure 10:
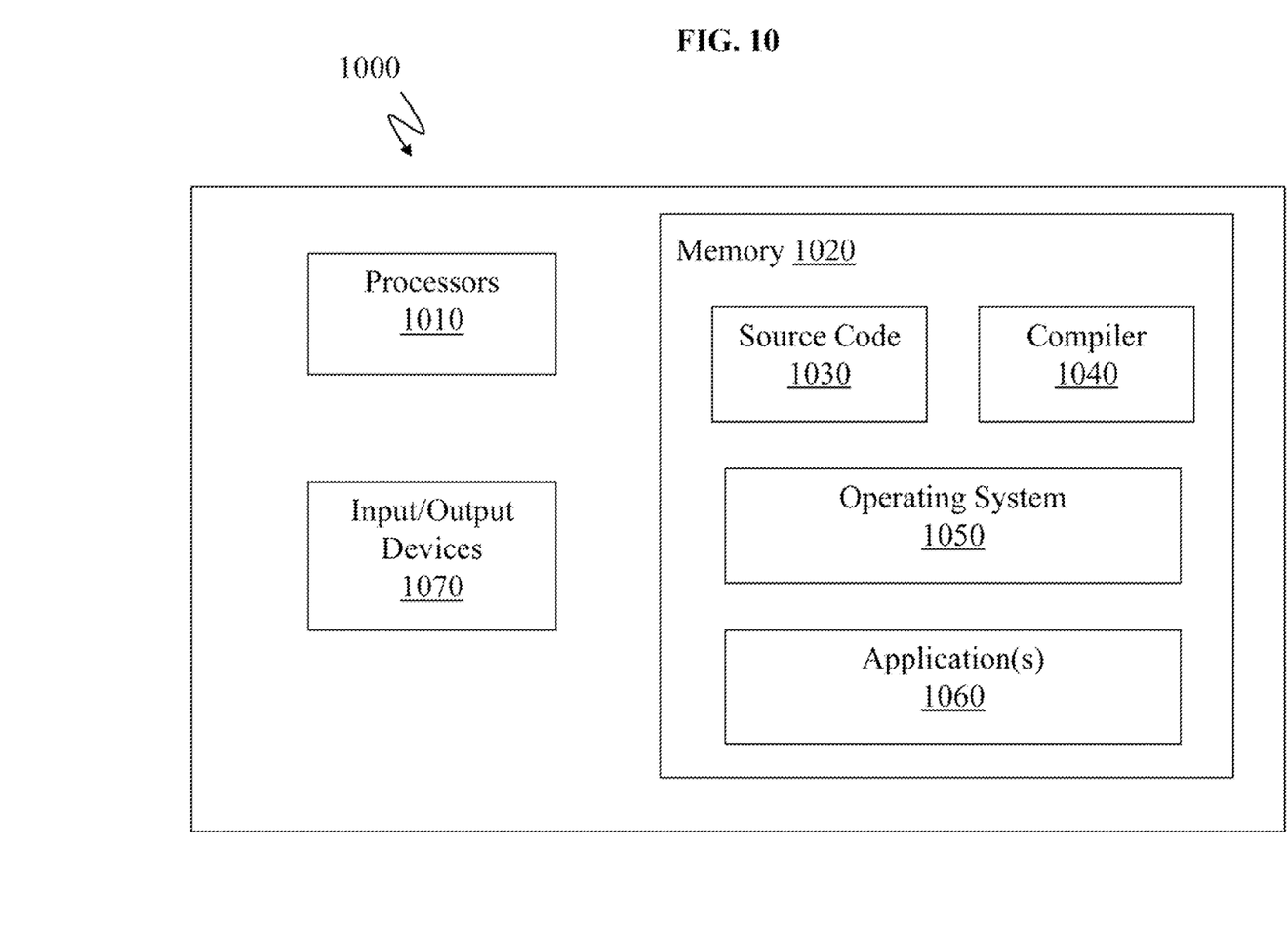
FIG. 10 illustrates an example of a computer having capabilities, which may be included in exemplary embodiments.

FIG. 10 illustrates an example of a computer 1000 having capabilities, which may be included in exemplary embodiments. Various methods, procedures, modules, and techniques discussed herein may also incorporate and/or utilize the capabilities of the computer 1000. One or more of the capabilities of the computer 1000 may be implemented in any element discussed herein, such as the communication device 100, server 105, server 110, server 120, metadata database 130, email server and/or storage systems 125, and network 115.

Generally, in terms of hardware architecture, the computer 1000 may include one or more processors 1010, computer readable memory 1020, and one or more input and/or output (I/O) devices 1070 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1010 is a hardware device for executing software that can be stored in the memory 1020. The processor 1010 can be virtually any custom made or commercially available processor, a central processing unit (CPU), a data signal processor (DSP), or an auxiliary processor among several processors associated with the computer 1000, and the processor 1010 may be a semiconductor based microprocessor in the form of a microchip or a macroprocessor.

The computer readable memory 1020 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1020 may incorporate electronic, magnetic, optical, and/or other types of storage media. Note that the memory 1020 can have a distributed architecture, where various components are situated remote from one another, but can be accessed by the processor 1010.

The software in the memory 1020 may include one or more separate programs, each of which comprises an ordered listing of executable instructions for implementing logical functions. The software in the memory 1020 includes a suitable operating system (O/S) 1050, compiler 1040, source code 1030, and one or more applications 1060 of the exemplary embodiments. As illustrated, the application 1060 comprises numerous functional components for implementing the features, processes, methods, functions, and operations of the exemplary embodiments. The application 1060 of the computer 1000 may represent numerous applications, agents, software components, modules, interfaces, etc., as discussed herein but the application 1060 is not meant to be a limitation.

The operating system 1050 may control the execution of other computer programs, and provides scheduling, input-output control, file and data management, memory management, and communication control and related services.

The application(s) 1060 may employ a service oriented architecture, which may be a collection of services that communicate with each. Also, the service oriented architecture allows two or more services to coordinate and/or perform activities (for example, on behalf of one another). Each interaction between services can be self-contained and loosely coupled, so that each interaction is independent of any other interaction.

Further, the application 1060 may be a source program, executable program (object code), script, or any other entity comprising a set of instructions to be performed. When a source program, then the program is usually translated via a compiler (such as the compiler 1040), assembler, interpreter, or the like, which may or may not be included within the memory 1020, so as to operate properly in connection with the O/S 1050. Furthermore, the application 1060 can be written as (a) an object oriented programming language, which has classes of data and methods, or (b) a procedure programming language, which has routines, subroutines, and/or functions.

The I/O devices 1070 may include input devices (or peripherals) such as, for example but not limited to, a mouse, keyboard, scanner, microphone, camera, etc. Furthermore, the I/O devices 1070 may also include output devices (or peripherals), for example but not limited to, a printer, display, etc. Finally, the I/O devices 1070 may further include devices that communicate both inputs and outputs, for instance but not limited to, a NIC or modulator/demodulator for accessing remote devices, other files, devices, systems, or a network, a radio frequency (RF) or other transceiver, a telephonic interface, a bridge, a router, etc. The I/O devices 1070 also include components for communicating over various networks, such as the Internet or an intranet. The I/O devices 1070 may be connected to and/or communicate with the processor 1010 utilizing Bluetooth connections, cables (via, for example, Universal Serial Bus (USB) ports, serial ports, parallel ports, firewire, HDMI (High-Definition Multimedia Interface), etc.).

When the computer 1000 is in operation, the processor 1010 is configured to execute software stored within the memory 1020, to communicate data to and from the memory 1020, and to generally control operations of the computer 1000 pursuant to the software. The application 1060 and the O/S 1050 are read, in whole or in part, by the processor 1010, perhaps buffered within the processor 1010, and then executed.

Aspects of the present invention may take the form of a computer program product embodied in one or more computer readable mediums having computer readable program code embodied therein. The application 1060 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The computer readable medium may be a computer readable signal medium or a computer readable storage medium.

When the application 1060 is implemented in software it should be noted that the application 1060 can be stored on virtually any computer readable storage medium for use by or in connection with any computer related system or method. A computer readable storage medium may be, for example, but not limited to, an electronic, magnetic, optical, electromagnetic, infrared, or semiconductor system, apparatus, or device, or any suitable combination of the foregoing.

More specific examples (a nonexhaustive list) of the computer-readable storage medium would include the following: an electrical connection (electronic) having one or more wires, a portable computer diskette (magnetic or optical), a hard disk, a random access memory (RAM) (electronic), a read-only memory (ROM) (electronic), an erasable programmable read-only memory (EPROM, EEPROM, or Flash memory) (electronic), an optical fiber (optical), a portable compact disc memory (CDROM, CD R/W), an optical storage device, a magnetic storage device, or any suitable combination of the foregoing. Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In exemplary embodiments, where the application 1060 is implemented in hardware, the application 1060 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 1000 includes non-limiting examples of software and hardware components that may be included in various devices and systems discussed herein, and it is understood that additional software and hardware components may be included in the various devices and systems discussed in exemplary embodiments.

The capabilities of the exemplary embodiments can be implemented in software, firmware, hardware or some combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof. "Exemplary embodiments" means exemplary embodiments of the present invention.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While exemplary embodiments of the present invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for storing a file as slices on storage elements comprising:
   receiving by a computer processor a request to store a file;
   splitting the file into slices;
   generating a respective header to individually identify each one of the slices;
   generating a plurality of emails, wherein for each email of the plurality of emails, an email body comprises one of the slices and an email subject line comprises the respective header;
   storing each of the plurality of emails on storage elements;
   generating first metadata for the file, wherein the first metadata comprises information to reconstruct the file from the slices;
   splitting the first metadata for the file into first metadata slices;
   generating a plurality of metadata emails which respectively comprise each one of the first metadata slices;
   storing each of the plurality of metadata emails on the storage elements; and
   generating a second metadata comprising information to unsplit and reconstruct the first metadata from the first metadata slices.

2. The method of claim 1, wherein the storage elements comprise at least one of: a plurality of email servers, a plurality of storage systems, and a plurality of email accounts.

3. The method of claim 1, wherein each one of the plurality of emails is stored on a different one of the storage elements.

4. The method of claim 1, further comprising
   generating duplicates of the plurality of emails such that each one of the slices is duplicated.

5. The method of claim 1, wherein the plurality of metadata emails are stored on different storage elements from the plurality of emails.

6. The method of claim 1, further comprising:
   generating slices of garbage containing dummy data;
   generating a plurality of garbage emails comprising respective slices of garbage; and
   storing the plurality of garbage emails on the storage elements intermixedly with the plurality of emails comprising slices of the file.

7. The method of claim 1 further comprising generating at least one second metadata email comprising the second metadata.

8. A method for restoring a file that has been split into slices for storage comprising:
   receiving by a computer processor a request to retrieve a file;
   retrieving restore parameters from a first metadata corresponding to the file;
   retrieving slices of the file from a plurality of email bodies of a plurality of emails based on the restore parameters; and
   reconstructing the slices of the file to a restored file based on the restore parameters;
   responsive to the first metadata being split into metadata slices, reconstructing the first metadata wherein reconstructing the first metadata comprises accessing a second metadata to provide information about unsplitting and restoring the first metadata;
   determining whether garbage slices containing dummy data are intermixed with the slices of the file; and
   removing the garbage slices to leave only the slices of the file.

9. The method of claim 8 wherein accessing the second metadata further comprising retrieving second metadata from at least one second metadata email comprising the second metadata.

10. A computer program product for storing a file as slices on storage elements, the computer program product comprising:
- a nontransitory computer readable storage medium having computer readable program code embodied therewith, the computer readable program code comprising:
- computer readable program code configured to receive a request to store a file;
- computer readable program code configured to split the file into slices;
- computer readable program code configured to generate a respective header to individually identify each one of the slices;
- computer readable program code configured to generate a plurality of emails, wherein for each email of the plurality of emails: an email body comprises one of the slices and an email subject line comprises the respective header;
- computer readable program code configured to store each of the plurality of emails on storage elements;
- computer readable program code configured to generate first metadata for the file, wherein the first metadata comprises information to reconstruct the file from the slices;
- computer readable program code configured to split the first metadata for the file into first metadata slices;
- computer readable program code configured to generate a plurality of metadata emails which respectively comprise each one of the first metadata slices; and
- computer readable program code configured to store each of the plurality of metadata emails on the storage elements; and
- computer readable program code configured to generate a second metadata comprising information to unsplit and reconstruct the first metadata from the first metadata slices.

11. The computer program product of claim 10, wherein the plurality of metadata emails are stored on different storage elements from the plurality of emails.

12. The computer program product of claim 10, further comprising:
- computer readable program code configured to generate slices of garbage containing dummy data;
- computer readable program code configured to generate a plurality of garbage emails comprising respective slices of garbage; and
- computer readable program code configured to store the plurality of garbage emails on the storage elements intermixedly with the plurality of emails comprising slices of the file.

13. The computer program product of claim 10 further comprising computer readable program code configured to generate at least one second metadata email comprising the second metadata.

14. A computer program product for restoring a file that has been split into slices for storage, the computer program product comprising:
- a nontransitory computer readable storage medium having computer readable program code embodied therewith, the computer readable program code comprising:
- computer readable program code configured to receive a request to retrieve a file;
- computer readable program code configured to retrieve restore parameters from a first metadata corresponding to the file;
- computer readable program code configured to retrieve slices of the file from a plurality of email bodies of a plurality of emails based on the restore parameters;
- computer readable program code configured to reconstruct the slices of the file to a restored file based on the restore parameters; and
- responsive to the first metadata being split into metadata slices, computer readable program code configured to reconstruct the first metadata comprising computer readable program code configured to access a second metadata to provide information about unsplitting and restoring the first metadata from the metadata slices;
- computer readable program code configured to determine whether garbage slices containing dummy data are intermixed with the slices of the file; and
- computer readable program code configured to remove the garbage slices to leave only the slices of the file.

15. The computer program product of claim 14 wherein computer readable program code configured to access the second metadata further comprising computer readable program code configured to retrieve at least one second metadata email comprising the second metadata.

* * * * *